United States Patent [19]

Rotermund et al.

[11] Patent Number: 5,895,792
[45] Date of Patent: Apr. 20, 1999

[54] PRODUCTION OF RIGID POLYURETHANE FOAMS

[75] Inventors: Udo Rotermund, Ortrand; Renate Hempel, Ruhland; Holger Seifert, Hüde; Werner Wiegmann, Rahdem, all of Germany

[73] Assignee: BASF Aktiengesellschaft, Ludwigshafen, Germany

[21] Appl. No.: 08/935,911

[22] Filed: Sep. 23, 1997

[30] Foreign Application Priority Data

Sep. 24, 1996 [DE] Germany ............... 196 39 121

[51] Int. Cl.⁶ ........................................... C08G 18/50
[52] U.S. Cl. ........................... 521/131; 521/167; 521/175
[58] Field of Search ............................ 521/167, 131, 521/175

[56] References Cited

FOREIGN PATENT DOCUMENTS 9623017  8/1996  WIPO.

Primary Examiner—Rachel Gorr
Attorney, Agent, or Firm—Fernando A. Borrego

[57] ABSTRACT

In a process for producing rigid polyurethane foams having improved heat distortion resistance and reduced thermal conductivity by reacting a) polyisocyanates with
b) compounds containing hydrogen atoms reactive toward isocyanates, in the presence of
c) water, and, if desired,
d) physically acting blowing agents and
e) catalysts and known auxiliaries and/or additives, the compounds b) containing hydrogen atoms reactive toward isocyanates are a polyol mixture comprising b1) a polyol which can be prepared by addition of ethylene oxide and/or propylene oxide onto a hexitol or a hexitol mixture, with the total hexitol content of the polyol mixture being from 15 to 30% by weight, based on the polyol mixture, and b2) a polyol which can be prepared by addition of ethylene oxide and/or propylene oxide onto one or more aromatic amines, with the total amine content of the polyol mixture being from 1 to 10% by weight, based on the polyol mixture, and the amount of the polyol mixture in the component b) is from 60 to 100 parts by mass per 100 parts by mass of the component b).

20 Claims, No Drawings

PRODUCTION OF RIGID POLYURETHANE FOAMS

The present invention relates to a process for producing rigid polyurethane foams.

The production of rigid polyurethane foams by reacting polyisocyanates with H-functional compounds, in particular polyols, and the use of these foams as thermal insulation material has been known for a long time and described many times in the literature. An important application area is thermal insulation at elevated temperatures, for example in plastic-sheathed pipes. These comprise an inner pipe, usually of steel, which transports the heating medium and is surrounded by rigid polyurethane foam for thermal insulation. The rigid foam is sealed on the outside with a moisture barrier, usually a polyethylene layer, and, for structural reasons, a mechanical bond between the inner pipe and the outer polyethylene pipe has to be provided by the rigid polyurethane foam. The plastic-sheathed pipes should have a useful life of 30–50 years.

The production of rigid polyurethane foams is described, for example, in Kunststoff-Handbuch, Volume 7, Polyurethane, Carl-Hanser-Verlag, Munich, 1st Edition 1969, 2nd Edition 1983 and 3rd Edition 1993. Thermal insulation using plastic-sheathed pipes is described in the 3rd Edition of the Kunststoffhandbuch, Volume 7.

The plastic-sheathed pipes can be produced discontinuously, but also continuously using a technology similar to the double conveyor belt method for producing rigid polyurethane foam composite elements.

According to the present state of the art, the heating medium, usually water under pressure, is heated to temperatures up to 140° C. The trend is toward even higher temperatures, eg. from 150° C. to short-term 160° C., because of the energy saving which this results in for thermodynamic reasons. It is therefore desirable to lower the thermal conductivity of the rigid polyurethane foam, particularly at higher temperatures.

Since, for ecological reasons, the chlorofluorocarbons (CFCs), for example trichlorofluoromethane (R11), used as blowing agents for rigid polyurethane foam may no longer be used, alternative blowing agents have had to be sought.

A frequently employed possibility is the use of carbon dioxide. This is usually generated by the reaction of water with the isocyanate groups. Although in this variant the ozone damage potential (ODP) is reduced to zero and the global warming potential (GWP) is considerably reduced in comparison with R11, at the same time the thermal insulating action of the rigid polyurethane foam is greatly reduced, ie. the thermal conductivity is increased. Combining water with hydrocarbons as blowing agents lowers the ODP and the GWP to about the same degree as in the case of pure carbon dioxide, but the thermal conductivity of the foam is lower than when pure carbon dioxide is used. The excellent values of R11 could also not be achieved in this way.

Hydrocarbons which are particularly suitable as blowing agents are the pentanes which have a comparatively low thermal conductivity of the gas and a sufficiently low boiling point. The publications by Heilig, G. Kunststoffe 81(1991), pp. 622–625 and Heilig, B et al., Kunststoffe 81(1991), pp. 790–794 provide a detailed discussion of the blowing of rigid polyurethane foams using pentane.

According to EP-A-421 269, cyclopentane is favored as blowing agent because of its low intrinsic thermal conductivity, but leads to foams having a higher thermal conductivity than R11.

A further disadvantage of the rigid polyurethane foams foamed using carbon dioxide or carbon dioxide and hydrocarbons is their low heat distortion resistance. In practical use, the pipes sheathed with rigid polyurethane foam and a polyethylene skin are buried in the ground and have to withstand the pressure of the earth over the long term, even under the conditions of thermal expansion at pipe bends at elevated temperature, without the mechanical bond between the inner pipe and the outer pipe being impaired. Too high a permanent deformation of the rigid foam at elevated temperature impairs the durability of the bond, particularly under the changing temperature conditions which naturally occur over the course of the year. This deformation cannot be reduced simply by increasing the compressive E modulus, since the associated brittleness likewise leads to impairment of the bond because of excessively high stress and crack formation resulting from the unavoidable thermal expansion processes.

Apart from the above-described demands made of the rigid polyurethane foams used for producing plastic-sheathed pipes, the resistance to chemical degradation also plays an important role. According to the European Standard EN 253, 1994 Edition, this degradation is characterized by artificially accelerated aging at temperatures above the use temperatures, eg. at 170° C. In the laboratory, this aging is usually carried out by means of the flask test in which the foam is stored at 180° C. for a number of weeks in aluminum pressure flasks and is subsequently assessed visually and, if appropriate, tested.

The rigid polyurethane foams are usually produced using polyols which are prepared by addition of alkylene oxides, usually propylene oxide or ethylene oxide/propylene oxide mixtures, onto H-functional initiator substances. Initiator substances used are, for example, polyfunctional, hydroxyl-containing compounds such as glycerol, pentaerythritol, trimethylolpropane, sucrose or sorbitol. Mixtures of such polyols are also known, for example from US-A-4,469,822 or DE-A-39 93 335. The use of mixtures of sorbitol and sucrose polyols for rigid polyurethane foam for pipe insulation is mentioned in EP-A-668 306 and DE-A-44 05 061. However, the rigid polyurethane foams thus produced have unsatisfactorily high thermal conductivities using carbon dioxide or carbon dioxide/cyclopentane mixtures as blowing agents. In addition, the heat distortion resistances measured at 150° C. or 160° C. are unsatisfactory.

Furthermore, the use of polyether alcohols which have been initiated with aromatic amines, in particular tolylenediamine (TDA), for producing rigid polyurethane foams is known, for example from U.S. Pat. No. 4,469,822, EP-A-581 191, EP-A-421 269 or EP-A-408 048.

EP-A-408 048 describes rigid polyurethane foams whose polyol component is a polyol mixture. This polyol mixture comprises a polyether alcohol whose initiator substance is an acyclic sugar alcohol having 5 or 6 carbon atoms, in particular sorbitol, and at least one amine-initiated polyether alcohol. The polyol component has an average hydroxyl number of from 300 to 430 mg KOH/g, the sugar content is from 3 to 14% by weight, the TDA content is below 8% by weight. The blowing agent used is water in an amount of from 4 to 7% by weight, based on the polyol component mentioned, preferably in admixture with halogenated and/or partially halogenated hydrocarbons such as R11, HCFC 123 and HCFC 141 b. However, the high water content of the polyol component leads to foams which are too brittle for use in pipe insulation and on prolonged use display crack formation as a result of which the mechanical bond between the pipe carrying the medium and the wall is no longer ensured. The co-blowing agents described in EP-A-408 048 are, if not already prohibited, likewise ecologically dubious.

The use of carbon dioxide alone or together with small amounts of co-blowing agents leads, however, apart from the brittleness mentioned above, to foams having an undesirably high thermal conductivity and an insufficient heat distortion resistance at elevated temperatures.

It is an object of the present invention to provide rigid polyurethane foams for use in plastic-sheathed pipes, which foams have a low thermal conductivity and a high heat distortion resistance at high temperatures, can be produced without the use of halogenated hydrocarbons and display low chemical degradation.

We have found that this object is achieved by use of a polyol mixture comprising a polyol prepared from ethylene oxide and/or propylene oxide using a hexitol or a hexitol mixture as initiator substance, where the total hexitol content of the polyol mixture is from 15 to 30% by weight, and a polyol prepared from ethylene oxide and/or propylene oxide and at least one aromatic amine as initiator substance, where the total amine content of the polyol mixture is from 1 to 10% by weight.

The present invention accordingly provides a process for producing rigid polyurethane foams having improved heat distortion resistance and reduced thermal conductivity by reacting a) polyisocyanates with b) compounds containing hydrogen atoms reactive toward isocyanates, in the presence of c) water, and, if desired, d) physically acting blowing agents and e) catalysts and known auxiliaries and/or additives, wherein the compounds b) containing hydrogen atoms reactive toward isocyanates are a polyol mixture comprising b1) a polyol which can be prepared by addition of ethylene oxide and/or propylene oxide onto a hexitol or a hexitol mixture, with the total hexitol content of the polyol mixture being from 15 to 30% by weight, preferably 16–22% by weight, in particular 17–20% by weight, and b2) a polyol which can be prepared by addition of ethylene oxide and/or propylene oxide onto one or more aromatic amines, with the total amine content of the polyol mixture being from 1 to 10% by weight, and the amount of the polyol mixture in the component b) is from 60 to 100 parts by mass per 100 parts by mass of the component b).

The present invention further provides the rigid polyurethane foams produced by this process.

The hexitols used for preparing the polyol b1) are described, for example, in Römpps Chemie Lexikon, 9th Edition, Georg Thieme Verlag Stuttgart-New York (1990). The hexitols can be used either individually or as any mixtures with one another as initiator substances and thus reacted with the alkylene oxides. Preference is given to using sorbitol, mannitol or dulcitol either alone or as a mixture with one another. Particular preference is given to sorbitol.

The hexitols can also be reacted together with other H-functional coinitiators. Coinitiators used are, in particular, liquid H-functional compounds, preferably difunctional and/or trifunctional alcohols such as ethylene glycol, propylene glycol and glycerol. Another coinitiator frequently used is water which reacts with the alkylene oxides to form glycols.

Alkylene oxides used are usually the lower alkylene oxides ethylene oxide, propylene oxide and butylene oxide. Preference is given to using ethylene oxide and propylene oxide. The alkylene oxides can be used individually or in admixture with one another.

When using a plurality of alkylene oxides, these can be added onto the initiator substance either successively as blocks or in admixture with one another as a random mixture. The addition of the alkylene oxides onto the initiator substance is usually carried out using basic, in particular alkaline, catalysts. The preparation process for the polyether alcohols is described, for example, in the Kunststoffhandbuch, Volume 7, "Polyurethane" edited by G ünther Oertel, 3rd Edition 1993, Carl-Hanser-Verlag Munich.

The aromatic amines used for preparing the polyol b2) are, in particular, tolylenediamine (TDA) and diphenylmethanediamine (MDA).

When using TDA, either pure TDA isomers or mixtures of different TDA isomers can be used. If isomer mixtures are employed, it is possible to use mixtures of 2,4- and 2,6-TDA in any ratios, mixtures of vicinal TDA isomers or mixtures of all TDA isomers in any ratios.

When using MDA, either the pure two-ring product or mixtures of this with polyphenylenepolymethylenepolyamines can be used. It is also possible to use mixtures of TDA and MDA.

The aromatic amines can be used together with the coinitiators described for the preparation of the polyol b1). Particularly for MDA, owing to the high viscosity, the concomitant use of low-viscosity coinitiators is advantageous.

Owing to the basicity of the aromatic amines, the use of additional basic catalysts can omitted. However, to improve the space-time yield it is customary to use basic catalysts, in particular alkali metal hydroxides. As regards the alkylene oxides used and the preparation process, what has been said for the preparation of the polyols b1 applies similarly.

The hydroxyl numbers of the polyols b1) and b2) are in the range from 150 to 800 mg KOH/g, preferably 250–700 mg KOH/g, in particular from 350 to 600 mg KOH/g. The hexitol content of polyol b1) is greater than 17% by weight, based on b1); the amine content of polyol b2) is greater than 15% by weight, based on b2). The polyol mixture of b1) and b2) is used in an amount of from 60 to 100 parts by weight per 100 parts by weight of component b).

The ratio of the polyols b1) and b2) to one another should be selected such that the total hexitol content of the polyol mixture is from 15 to 30% by weight and the total amine content of the polyol mixture is from 1 to 10% by weight, in each case based on the total weight of the polyol mixture.

If the hexitol content is too high, the viscosity of the polyols increases to such an extent that processing becomes too difficult. In the case of hexitol and amine contents which are too low and also in the case of amine contents above 10% by weight, the heat distortion resistance of the foams is too low.

The polyol mixture can be used together with up to 40 parts by weight, based on 100 parts by weight of the component b), of other H-functional compounds which will be discussed in more details below.

As regards the individual starting materials for the process of the present invention, the following may be said:

a) Suitable organic polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates, such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (raw MDI) and mixtures of raw MDI and tolylene diisocyanates. The organic diisocyanates and polyisocyanates can be used individually or in the form of their mixtures.

Use is frequently also made of modified polyfunctional isocyanates, ie. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples are: organic, preferably aromatic polyisocyanates containing urethane groups and having NCO contents of from 33.6 to 15% by weight, preferably from 31 to 21% by weight, based on the total weight, for example diphenylmethane 4,4'-diisocyanate modified with low molecular weight diols, triols, dialkylene glycols, trialkylene glycols or polyoxyalkylene glycols having molecular weights up to 6000, in particular having molecular weights up to 1500, modified diphenylmethane 4,4'- and 2,4'-diisocyanate mixtures or modified raw MDI or tolylene 2,4- or 2,6-diisocyanate, with examples of dialkylene glycols or polyoxyalkylene glycols which can be used individually or as mixtures being: diethylene glycol, dipropylene glycol, polyoxyethylene, polyoxypropylene and polyoxypropylene-polyoxyethylene glycols, triols and/or tetrols. Also suitable are prepolymers containing NCO groups and having NCO contents of from 25 to 3.5% by weight, preferably from 21 to 14% by weight, based on the total weight, and prepared from the polyester and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or raw MDI. Other modified polyisocyanates which have been found to be useful are liquid polyisocyanates containing carbodiimide groups and/or isocyanurate rings and having NCO contents of from 33.6 to 15% by weight, preferably from 31 to 21% by weight, based on the total weight, for example those on the basis of diphenylmethane 4,4'-, 2,4'- and/or 2,2'-diisocyanates and/or tolylene 2,4- and/or 2,6-diisocyanate.

The modified polyisocyanates can, if desired, be mixed with one another or with unmodified organic polyisocyanates such as diphenylmethane 2,4'- and/or 4,41-diisocyanate, raw MDI, tolylene 2,4- and/or 2,6-diisocyanate.

Polyisocyanates which have been found to be particularly useful are diphenylmethane diisocyanate isomer mixtures or raw MDI having a diphenylmethane diisocyanate isomer content of from 33 to 55% by mass and polyisocyanate mixtures containing urethane groups and based on diphenylmethane diisocyanate having an NCO content of from 15 to 33% by mass.

b) Suitable compounds containing at least two hydrogen atoms reacted toward isocyanates, which can be used together with the polyol mixture described, are compounds bearing two or more reactive groups selected from among OH groups, SH groups, NH groups, $NH_2$ groups and CH acid groups such as β-diketo groups, in the molecule.

Use is advantageously made of those having a functionality of from 2 to 8, preferably from 2 to 6, and a molecular weight of from 300 to 8000, preferably from 400 to 4000. Compounds which have been found to be useful are, for example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols. The hydroxyl number of the polyhydroxyl compounds is here generally from 100 to 850 and preferably from 200 to 600.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular diols are ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

To prepare the polyester polyols, the organic, eg. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C. at atmospheric pressure or under reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distil off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 300 to 3000, preferably from 350 to 2000 and in particular from 400 to 600.

However, polyols which are particularly preferably used are polyether polyols which can be prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts and with addition of at least one initiator molecule containing from 2 to 8, preferably from 2 to 6, reactive hydrogen atoms in bonded form, or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, for example unalkylated, monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine.

Other suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric and/or trihydric alcohols such as ethanediol, 1,2- and 1,3-propanediol, diethylene glycol, dipropylene glycol, 1,4-butanediol, 1,6-hexanediol glycerol, trimethylolpropane, pentaerythritol and sucrose.

The polyether polyols, preferably polyoxypropylene and polyoxypropylene-polyoxyethylene polyols, have a functionality of preferably from 2 to 6 and in particular from 2 to 4 and molecular weights of from 300 to 8000, preferably from 400 to 1500 and in particular from 420 to 1100 and suitable polyoxytetramethylene glycols have a molecular weight up to about 3500.

Also suitable as polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyether polyols using methods similar to those described in German Patents 11 11 394, 12 22 669 (U.S. Pat. Nos. 3,304,273, 3,383,351, 3,523,093), 11 52 536 (GB 10 40 452) and 11 52 537 (GB 987 618), and also polyether polyol dispersions which contain as dispersed phase, usually in an amount of from 1 to 50% by weight, preferably from 2 to 25% by weight: eg. polyureas, polyhydrazides, polyurethanes containing bonded tert-amino groups and/or melamine and are described, for example, in EP-B-011 752 (U.S. Pat. No. 4,304,708), U.S. Pat. No. 4,374,209 and DE-A-32 31 497.

The polyether polyols can, like the polyester polyols, be used individually or in the form of mixtures. They can also be mixed with the graft polyether polyols or polyester polyols or with the hydroxyl-containing polyesteramides, polyacetals, polycarbonates and/or polyetherpolyamines. Suitable hydroxyl-containing polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals.

Suitable hydroxyl-containing polycarbonates are those of the type known per se, which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyesteramides include, for example, the predominantly linear compensates obtained from polybasic, saturated and/or unsaturated carboxylic acids or their anhydrides and polyfunctional saturated and/or unsaturated aminoalcohols or mixtures of polyfunctional alcohols and aminoalcohols and/or polyamines.

Suitable polyether polyamines can be prepared from the abovementioned polyether polyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols using amines or ammonia in the presence of hydrogen and catalysts (DE 12 15 373).

The rigid foams based on isocyanate can be produced with or without concomitant use of chain extenders and/or crosslinkers. However, the addition of chain extenders, crosslinkers or, if desired, mixtures thereof can prove to be advantageous for modifying the mechanical properties, eg. the hardness. Chain extenders and/or crosslinkers used are diols and/or triols having molecular weights of less than 400, preferably from 60 to 300. Examples of suitable chain extenders/crosslinkers are aliphatic, cycloaliphatic and/or araliphatic diols having from 2 to 14, preferably from 4 to 10, carbon atoms, for example ethylene glycol, 1,3-propanediol, 1,10-decandiol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane, and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for producing the rigid foams based on isocyanate, they are advantageously used in an amount of from 0 to 20% by weight, preferably from 2 to 8% by weight, based on the weight of the polyol compound (b).

c) Water is preferably used as blowing agent and liberates carbon dioxide by reaction with the isocyanate group. The water content is from 0.1 to 4% by weight, preferably from 0.3 to 3% by weight, in particular from 0.5 to 2% by weight, based on the total mass of all hydrogen-active compounds. A water content which is too high can lead to increased brittleness and thermal conductivity of the foam.

d) In addition to water, it is also possible to use physically acting blowing agents d). In particular, use is made of low-boiling hydrocarbons, lower monofunctional alcohols, acetals or partially halogenated hydrocarbons, known as HCFCs. Preference is given to low-boiling cyclic and acyclic saturated hydrocarbons having up to 12 carbon atoms which can be used individually or in any mixtures with one another, in particular pentanes which can be used either as mixtures of the pentane isomers or as the pure isomers. Owing to the particularly good thermal conductivity problems, cyclopentane is particularly preferred. The amount of the hydrocarbons is from 1 to 30 parts by weight, preferably 16–22 parts by weight, in particular 6–12 parts by weight, based on the weight of all hydrogen-active compounds.

e) Catalysts (e) used for producing the rigid foams of the present invention are, in particular, compounds which strongly accelerate the reaction of the compounds of the component (b) containing reactive hydrogen atoms, in particular hydroxyl groups, with the organic, modified or unmodified polyisocyanates (a). The isocyanate groups can, however, also be made to react with one another by means of suitable catalysts (e), preferably forming isocyanurate structures in addition to the adducts of isocyanates (a) and the compounds containing hydrogen-active groups (b).

Catalysts used are thus, in particular, those substances which accelerate the reactions of the isocyanates, in particular urethane, urea and isocyanurate formation.

Preferred catalysts for this purpose are tertiary amines, tin and bismuth compounds, alkali metal and alkaline earth metal carboxylates, quaternary ammonium salts, s-hexahydrotriazines and tris(dialkylaminomethyl) phenols.

Examples of suitable catalysts are organic metal compounds, preferably organic tin compounds such as tin(II) salts of organic carboxylic acids, eg. tin(II) acetate, tin(II) octoate, tin(II) ethylhexoate and tin(II) laurate, and the dialkyltin(IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples of amines are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl) urea, dimethylpiperazine, 1,2-dimethylimidazole, 1-azabicyclo[3.3.0]octane and preferably 1,4-diazabicyclo[2.2.2]octane, and alkanolamine compounds such as triethanolamine,triisopropanolamine, N-methyldiethanolamine and N-ethyldiethanolamine and dimethylethanolamine.

Other suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the component (b).

If desired, auxiliaries and/or additives can also be incorporated into the reaction mixture for producing the rigid foams based on isocyanate. Examples which may be mentioned are surface-active substances, foam stabilizers, cell regulators, flame retardants, fillers, dyes, pigments, hydrolysis inhibitors, fungistatic and bacteriostatic substances.

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, eg. diethylamine oleate, diethanolamine stearate, diethanolamine ricinoleate, salts of sulfonic acids, eg. alkali metal or ammonium salts of dodecylbenzene- or dinaphthylmethanedisulfonic acid and ricinoleic acid; foam stabilizers such as siloxane-oxalkylene copolymers and other organopolysiloxanes, ethoxylated alkylphenols, ethoxylated fatty alcohols, paraffin oils, castor oil or ricinoleate esters, Turkey red oil and peanut oil and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the component (b).

Flame retardants which can be used are all the substances customary for this purpose in polyurethane chemistry. Use is predominately made of halogen and phosphorus compounds, for example esters of orthophosphoric acid and methanephosphonic acid, eg. tris(2-chloropropyl) phosphate or diethyl bis(2-hydroxyethyl)

aminomethylphosphonate. Since the rigid foam based on isocyanate should in the future be manufactured using only halogen-free additives, the flame retardants must also be free of halogen. Suitable flame retardants of this type are, for example, derivatives of phosphoric acid, phosphorous acid or phosphonic acid which are reactive toward isocyanate, if desired in combination with unreactive liquid and/or solid halogen-free flame retardants, eg. comprising organic derivatives of phosphoric acid, phosphonic acid or phosphorous acid or salts of phosphoric acid and other materials which aid flame resistance, for example starch, cellulose, aluminum hydroxide, etc. In general it has been found to be advantageous to use from 5 to 40 parts by weight, preferably from 5 to 25 parts by weight, of the flame retardants mentioned per 100 parts by weight of the component (b).

For the purposes of the present invention, fillers, in particular reinforcing fillers, are the customary organic and inorganic fillers, reinforcers, weighting agents, agents for improving the abrasion behavior in paints, coating compositions, etc., known per se. Specific examples are: inorganic fillers such as siliceous minerals, for example sheet silicates such as antigorite, serpentine, hornblends, amphiboles, chrysotile, talc; metal oxides such as kaolin, aluminum oxides, titanium oxides and iron oxides, metal salts such as chalk, barite and inorganic pigments such as cadmium sulfide, zinc sulfide and also glass, etc. Preference is given to using kaolin (china clay), aluminum silicate and coprecipitates of barium sulfate and aluminum silicate and also natural and synthetic fibrous minerals such as wollastonite, metal and in particular glass fibers of various lengths which may be sized. Suitable organic fillers are, for example: starch, coal, melamine, rosin, cyclopentadienyl resins and graft polymers as well as cellulose fibers, polyamide, polyacrylonitrile, polyurethane, polyester fibers based on aromatic and/or aliphatic dicarboxylic esters and, in particular carbon fibers.

The inorganic and organic fillers can be used individually or as mixtures and are advantageously incorporated into the reaction mixture in amounts of from 0.5 to 50% by weight, preferably from 1 to 40% by weight, based on the weight of the components (a) to (c).

Further details regarding the abovementioned and further starting materials may be found in the specialist literature, for example the monograph by H. J. Saunders and K. C. Frisch "High Polymers", Volume XVI, Polyurethanes, Parts 1 and 2, Interscience Publishers 1962 and 1964 or the previously mentioned Kunststoffhandbuch, Polyurethane, Volume VII, Carl Hanser Verlag, Munich, Vienna, 1st, 2nd and 3rd Editions, 1966, 1983 and 1993.

To produce the rigid polyurethane foam of the present invention, the polyisocyanates (a) are reacted with the compounds containing hydrogen atoms reactive toward isocyanates. Here, the components (b) to (e) are usually combined into the polyol component. The polyisocyanate can be combined with the polyol component by stirring. However, it is usual to carry out foaming mechanically, with the components being combined in mixing aids and then introduced into the mold. The NCO index is here from 110 to 160. The rigid polyurethane foams produced according to the present invention have densities in the range from 50 to 120 kg/m$^3$.

For the industrial manufacture of insulated pipes, the reaction mixture can be introduced discontinuously into the hollow space between metal pipe and plastic covering layer of pre-assembled pipes or applied continuously to metal pipes around which the covering layer is subsequently laid.

The rigid polyurethane foams produced according to the present invention have a significantly lower thermal conductivity, an improved heat distortion resistance and a lower brittleness than foams which are not produced by the process of the present invention.

The invention is illustrated by the following examples.

EXAMPLES 1 to 14

Polyols used

Polyol 1

Prepared from 25.2 parts of sorbitol and 74.8 parts of propylene oxide using potassium hydroxide as catalyst and 0.5 parts of water as coinitiator. The hydroxy number (OHN) was 495 mg KOH/g, the viscosity at 25° C. was 17900 mpas.

Polyol 2

Prepared from 22.7% of a mixture of 2,3- and 3,4-toluylenediamine, 22.7% of ethylene oxide and 54.6% of 20 propylene oxide using potassium hydroxide as catalyst. The OHN was 406 mg KOH/g, the viscosity at 25° C. was 20900 mpas.

Polyol 3

Prepared from 28.0% of a mixture of 2,3- and 3,4-toluylenediamine, 22.0% of ethylene oxide and 50% of propylene oxide using potassium hydroxide as catalyst. The OHN was 395 mg KOH/g, the viscosity at 25° C. was 8176 mpas.

Polyol 4

Prepared from 1,2-propanediol as initiator and propylene oxide using potassium hydroxide as catalyst. The OHN was 105 mg KOH/g, the viscosity at 25° C. was 155 mPas.

Polyol 5

Prepared from 1,2-propanediol as initiator and propylene oxide using potassium hydroxide as catalyst. The OHN was 250 mg KOH/g, the viscosity at 25° C. was 70 mPas.

Polyol 6

Prepared from 24.8% of a mixture of 40 parts of 4,4'-diphenylmethanediamine, 4.5 parts of 2,4'-diphenylmethanediamine and 55.5 parts of polyphenylpolymethylenepolyamine, 5.7% of monoethylene glycol, 14.2% of ethylene oxide and 55.3% of 1,2-propylene oxide using potassium hydroxide as catalyst. The OHN was 377 mg KOH/g, the viscosity at 25° C. was 14094 mpas.

Polyol 7

Prepared from 18.3% of a mixture of 40 parts of 4,4'-diphenylmethanediamine, 4.5 parts of 2,4'-diphenylmethanediamine and 55.5 parts of polyphenylpolymethylenepolyamine, 9.4% of glycerol, 10.5% of ethylene oxide and 61.8% of 1,2-propylene oxide using potassium hydroxide as catalyst. The OHN number was 386 mg KOH/g, the viscosity at 25° C. was 9430 mPas.

Production of the Rigid Polyurethane Foams

The polyols indicated in the table were combined with the blowing agents, stabilizers, catalysts and auxiliaries to form the A component. 100 parts by weight of the A component were mixed in accordance with the NCO index indicated in the table with a mixture of diphenylmethane diisocyanate and polyphenylpolymethylene polyisocyanates having an NCO content of 31.5% by mass (M20A from BASF Schwarzheide GmbH) with vigorous stirring or by means of a high-pressure foaming machine. 576 g of the mixture of A component and isocyanate were poured immediately after mixing into a mold which had the dimensions 300 mm×400 mm×80 mm and was at 45° C. The mold was subsequently closed tightly. The overall density of the moldings was 60 kg/m$^3$. After 30 minutes, the moldings were taken from the mold. After a storage time of 24 hours, test specimens were sawn from the interior of the foam block and then thermal conductivity and the heat distortion resistance were determined on these. The thermal conductivity at room temperature was measured using the instrument ANACON, Model 88 from Anacon, St. Peters Road, Maidenhead, Berkshire, England SL6 7QA at a mean temperature of 23.9° C. (gradient 37.7° C./10° C.) and the thermal conductivity at elevated temperature was measured using the instrument Rapid-K VT 400 from Holometrix Inc., Boston, USA. The temperature gradient is indicated in the table.

The heat distortion resistance was measured as percentage deformation in accordance with DIN 18164 on specimens having the dimensions 50 mm×50 mm×50 mm after a loading of 0.04 N/mm$^2$ for 24 hours. The test temperatures are indicated in the table.

For the flask test, 2.5 l aluminum pressure flasks were filled with 187.5 g of the foaming mixture. This corresponds to a foam density of 75 kg/m$^3$. The flasks were then closed tightly and stored at 180° C. for a period of 6 weeks. The foam was then assessed visually and, if appropriate, the strength was tested in a compressive test in accordance with DIN 53421.

The more precise formulations, the parameters of the foams and is the results of the tests are shown in the table. The figures given for the components are parts by weight.

The examples show that the thermal conductivity of the foams which were produced using the polyol mixture of the present invention, both when water alone is used as blowing agent (Examples 1 and 2) and when alkanes are concomitantly used as blowing agents, are lower than in the case of foams which are not according to the present invention and the distortion resistance is improved, as expressed by the lower deformation.

TABLE

|  | Example 1 (C) | Example 2 (I) | Example 3 (C) | Example 4 (I) |
|---|---|---|---|---|
| Foaming | Manual | Manual | Manual | Manual |
| Polyol 1 | 67.2 | 67.2 | 63.2 | 63.2 |
| Polyol 2 | — | 28.2 | — | 25 |
| Polyol 3 | — | — | — | — |
| Aromatic amine (TDA) content of polyol blend in % | 0.0 | 6.6 | 0.0 | 6.4 |
| Sorbitol content of polyol blend in % | 25.1 | 17.7 | 25.1 | 18.0 |
| Polyol 4 | 21.3 | 3.7 | 20.0 | — |
| Polyol 5 | — | — | — | — |
| Dipropylene glycol | 5.3 | 0.9 | 5.0 | — |
| Water | 3.7 | 3.7 | 3.5 | 3.5 |
| Stabilizer B 8423 (Goldschmidt) | 1.65 | 1.65 | 1.5 | 1.5 |
| Dimethylcyclohexylamine | 0.85 | 0.85 | 0.8 | 0.8 |
| Cyclopentane | — | — | 6.0 | 6.0 |
| NCO index | 113 | 113 | 113 | 113 |
| Fiber time in s | 144 | 145 | 165 | 163 |
| Overall density in kg/m$^3$ | 60 | 59 | 59 | 59.2 |
| Density in the core, DIN 53420, in kg/m$^3$ | 51.5 | 53.6 | 50.4 | 50.9 |
| Heat distortion resistance at 140° C., in % | 10.0 | 6.3 | 3.8 | 1.9 |
| Thermal conductivity, ANACON, 24 h after foaming, in mW/mK | 26.1 | 25.5 | 24.3 | 23.5 |
| Thermal conductivity, ANACON, 7 days storage at 25° C., mW/mK | 33.5 | 29.3 | — | — |

C = Comparative Example
I = Example according to the present invention

TABLE

|  | Example 5 (C) | Example 6 (I) | Example 7 (C) | Example 8 (I) |
|---|---|---|---|---|
| Foaming | Manual | Manual | Machine | Machine |
| Polyol 1 | 72.8 | 70.0 | 72.8 | 70.0 |
| Polyol 2 | — | 25 | — | 25.0 |
| Polyol 3 | — | — | — | — |
| Aromatic amine (TDA) content of polyol blend in % by weight | 0.0 | 5.9 | 0.0 | 5.9 |
| Sorbitol content of polyol blend in % by weight | 25.1 | 18.5 | 25.1 | 18.5 |
| Polyol 4 | 11.1 | — | 11.1 | — |
| Polyol 5 | 11.1 | — | 11.1 | — |
| Water | 1.8 | 1.8 | 1.8 | 1.8 |
| Stabilizer B 8423 (Goldschmidt) | 1.7 | 1.7 | 1.7 | 1.7 |
| Dimethylcyclohexylamine | 1.5 | 1.5 | 1.5 | 1.5 |
| Cyclopentane | 11.0 | 11.0 | 11.0 | 11.0 |
| NCO index | 133 | 133 | 133 | 133 |
| Parts by mass of isocyanate | 145 | 158 | 145 | 158 |
| Fiber time in s | 141 | 139 | 140 | 141 |
| Overall density in kg/m$^3$ | 60 | 59 | 59 | 60 |
| Density in the core, DIN 53420, in kg/m$^3$ | 48.7 | 49.7 | 51.5 | 51.8 |
| Heat distortion resistance at 140° C., in % | 3.8 | 1.9 | 4.13 | 2.25 |
| Thermal conductivity, ANACON, 24 h after foaming, in mW/mK | 23.0 | 22.3 | 22.3 | 21.6 |
| Thermal conductivity, ANACON, 7 days storage at 25° C., mW/mK | 30.2 | 29.5 | 25.2 | 23.6 |
| Flask test, Ex. 7 and 8, 180° C., 6 weeks, density 75 kg/m$^3$, values after the test | | Core density, kg/m$^3$ | 69 | 67 |
| | | Compressive strength in N/mm$^2$ | 0.63 | 0.61 |
| | | Appearance | No cracks, in order | No cracks, in order |

TABLE

|  | Example 9 (C) | Example 10 (I) | Example 11 (I) |
|---|---|---|---|
| Foaming | Machine | Machine | Machine |
| Polyol 1 | 72.8 | 69.72 | 69.72 |
| Polyol 2 | — | 24.98 | — |
| Polyol 3 | — | — | 24.98 |

TABLE-continued

|  | Example 9 (C) | Example 10 (I) | Example 11 (I) |
|---|---|---|---|
| Aromatic amine (TDA) content of polyol blend in % | 0.0 | 5.9 | 7.4 |
| Sorbitol content of polyol blend in % | 25.1 | 18.5 | 18.5 |
| Polyol 4 | 11.1 | — | — |
| Polyol 5 | 11.1 | — | — |
| Water | 1.8 | 1.9 | 1.9 |
| Stabilizer B 8423 (Goldschmidt) | 1.7 | 1.7 | 1.7 |
| Dimethylcyclohexylamine | 1.5 | 1.5 | 1.5 |
| Cyclopentane | 11.0 | 11.8 | 11.8 |
| NCO index | 133 | 133 | 133 |
| Parts by mass of isocyanate | 161 | 177 | 177 |
| Fiber time in s | 143 | 143 | 138 |
| Overall density in kg/m³ | 80 | 80 | 80 |
| Density in the core, DIN 53420, in kg/m³ | 64.6 | 66.4 | 66.9 |
| Heat distortion resistance at 150° C., in % | 4.2 | 2.5 | 1.8 |
| Thermal conductivity, ANACON, 24 h after foaming, in mW/mK | 22.8 | 22.4 | 22.3 |
| Thermal conductivity, ANACON, 7 days storage at 25° C., mW/mK | 25.3 | 24.3 | 25.2 |
| Thermal conductivity, Rapid-K, Gradient 140° C./50° C., storage 80° C./120 h, mW/mK, | 42.3 | 40.3 | 39.1 |
| Thermal conductivity, Rapid-K, Gradient 50° C./70° C., storage 80° C./120 h, mW/mK, | 35.9 | 33.9 | 32.8 |

TABLE

|  | Example 12 (C) | Example 13 (I) | Example 14 (I) |
|---|---|---|---|
| Foaming | Manual | Manual | Manual |
| Polyol 1 | 65.59 | 65.59 | 65.59 |
| Polyol 6 | — | 20 | — |
| Polyol 7 | — | — | 20 |
| Aromatic amine (MDA) in blend in % | 0.0 | 5.3 | 6.5 |
| Sorbitol content of polyol blend in % | 25.1 | 19.2 | 19.2 |
| Polyol 4 | 10.0 | — | — |
| Polyol 5 | 10.0 | — | — |
| Water | 1.62 | 1.62 | 1.62 |
| Stabilizer B 8423 (Goldschmidt) | 1.53 | 1.53 | 1.53 |
| Dimethylcyclohexylamine | 1.35 | 1.17 | 1.35 |
| Cyclopentane | 9.91 | 9.91 | 9.91 |
| NCO index | 133 | 133 | 133 |
| Fiber time in s | 138 | 140 | 138 |
| Overall density in kg/m³ | 70 | 70 | 70 |
| Density in the core, DIN 53420, in kg/m³ | 58.7 | 58.2 | 59.1 |
| Heat distortion resistance at 150° C., in % | 5.3 | 3.7 | 2.5 |
| Thermal conductivity, ANACON, 24 h after foaming, in mW/mK | 23.4 | 22.1 | 22.4 |
| Thermal conductivity, ANACON, 7 days storage at 25° C., mW/mK | 26.6 | 24.0 | 23.9 |

TABLE

|  | Example 15 (C) | Example 16 (C) |
|---|---|---|
| Polyol 1 | 34.22 | 28.36 |
| Polyol 2 | — | — |
| Polyol 3 | 32.34 | 33.08 |
| Aromatic amine (TDA) content of polyol blend in % | 13.6 | 15.1 |
| Sorbitol content of polyol blend in % | 10.0 | 8.2 |
| Polyol 4 | 9.5 | 20.98 |
| Polyol 5 | 9.5 | — |
| Dipropylene glycol | — | 5.01 |
| Water | 1.63 | 4.73 |
| Stabilizer B 8423 (Goldschmidt) | 1.57 | 1.42 |
| Dimethylcyclohexylamine | 1.28 | 0.4 |
| Cyclopentane | 10.09 | — |
| NCO index | 133 | 107 |
| Fiber time in s | 137 | 140 |
| Overall density in kg/m³ | 80 | 61 |
| Density in the core, DIN 53420, in kg/m³ | 64.5 | 52.8 |
| Heat distortion resistance at 150° C., in % | 8.8 | 12.1 at 140° C. |
| Thermal conductivity, ANACON, 24 h after foaming, in mW/mK | 23.2 | 25.7 |
| Thermal conductivity, ANACON, 7 days storage at 25° C., mW/mK | 25.5 | 32.8 |

We claim:

1. A process for producing rigid polyurethane foams having improved heat distortion resistance and reduced thermal conductivity comprising reacting a) polyisocyanates with b) compounds containing hydrogen atoms reactive toward isocyanates, in the presence of c) water, and, optionally, d) physically acting blowing agents and e) catalysts and known auxiliaries and/or additives, wherein the compounds b) containing hydrogen atoms reactive toward isocyanates comprise a polyol mixture comprising b1) a first polyol prepared by addition of ethylene oxide and/or propylene oxide onto a hexitol or a hexitol mixture, wherein the total hexitol content of the polyol mixture is from 15 to 30 percent by weight, based on the polyol mixture, and b2) a second polyol prepared by addition of ethylene oxide and/or propylene oxide onto one or more aromatic amines, wherein the total amine content of the polyol mixture is from 1 to 10 percent by weight, based on the polyol mixture, wherein the amount of the polyol mixture in the component b) is from 60 to 100 parts by mass per 100 parts by mass of the component b).

2. A process as claimed in claim 1, wherein the total hexitol content of the polyol mixture is from 16 to 22% by weight, based on the polyol mixture.

3. A process as claimed in claim 1, wherein the total hexitol content of the polyol mixture is from 17 to 20% by weight, based on the polyol mixture.

4. A process as claimed in claim 1, wherein the hexitol content of the polyol b1 is greater than 17% by weight, based on b1.

5. A process as claimed in claim 1, wherein the total amine content of polyol b2 is greater than 15% by weight, based on b2.

6. A process as claimed in claim 1, wherein the hexitol or hexitol mixture is selected from the group consisting of sorbitol, mannitol, dulcitol, and mixtures thereof.

7. A process as claimed in claim 1, wherein the hexitol used is sorbitol.

8. A process as claimed in claim 1, wherein the aromatic amine used is tolylenediamine.

9. A process as claimed in claim 1, wherein the aromatic amine used is a mixture of 2,4- and 2,6-tolylenediamine.

10. A process as claimed in claim 1, wherein the aromatic amines used are vicinal tolylenediamine isomers.

11. A process as claimed in claim 1, wherein the aromatic amine used is diphenylmethanediamine.

12. A process as claimed in claim 1, wherein the aromatic amines used are mixtures of diphenylmethanediamine and polyphenylpolymethylenepolyamine.

13. A process as claimed in claim 1, wherein the polyols b1 and b2 each have a hydroxyl number of from 150 to 800 mg KOH/g.

14. A process as claimed in claim 1, wherein the physically acting blowing agents d) comprise hydrocarbons.

15. A process as claimed in claim 1, wherein the physically acting blowing agents d) comprise hydrocarbons having up to 12 carbon atoms.

16. A process as claimed in claim 1, wherein the physically acting blowing agent comprises a pentane.

17. A process as claimed in claim 1, wherein the physically acting blowing agent comprises cyclopentane.

18. A process as claimed in claim 1, wherein the physically acting blowing agents d) comprise mixtures of hydrocarbons having up to 12 carbon atoms and containing at least 30 percent by weight of pentane, based on d).

19. A process as claimed in claim 1, wherein the physically acting blowing agents d) are used in an amount of from 1 to 30% by weight, based on the sum of the weights of the components b) and c).

20. A process for producing a rigid polyurethane foam comprising reacting a) a polyisocyanate with b) a compound containing isocyanate-reactive hydrogen atoms, in the presence of c) water, d) a physically active blowing agent and e) a catalyst and known auxiliaries and/or additives, wherein the compound containing isocyanate-reactive hydrogen atoms b) comprises from 60 to 100 parts by mass per 100 parts by mass of the component b) of a polyol mixture comprising b1) a first polyaddition product of ethylene oxide and/or propylene oxide onto a hexitol or a hexitol mixture, wherein the total hexitol content is from 15 to 30 percent by weight, based on the polyol mixture, and b2) a second polyaddition product of ethylene oxide and/or propylene oxide onto one or more aromatic amines, wherein the total amine content is from 1 to 10 percent by weight, based on the polyol mixture, wherein the rigid polyurethane foam exhibits improved heat distortion resistance and reduced thermal conductivity.

\* \* \* \* \*